United States Patent [19]

Erb

[11] 4,026,631

[45] May 31, 1977

[54] IMAGE INTERPRETATION INSTRUMENT

[76] Inventor: David K. Erb, 235 Forsyth Drive, Waterloo, Ontario, Canada

[22] Filed: Mar. 24, 1976

[21] Appl. No.: 670,071

[30] Foreign Application Priority Data

Apr. 1, 1975 United Kingdom ............ 13169/75

[52] U.S. Cl. ................................ 350/35; 33/20 D; 350/36; 350/136; 356/2
[51] Int. Cl.² ....................................... G02B 27/22
[58] Field of Search ................. 350/30, 32, 33, 35, 350/36, 48, 136; 356/2; 33/1 A, 20 D

[56] References Cited

UNITED STATES PATENTS

| 2,674,152 | 4/1954 | Wilkinson | 350/30 X |
| 3,464,761 | 9/1969 | Hofmann | 350/136 |
| 3,615,124 | 10/1971 | Blankenburg | 350/30 X |
| 3,729,830 | 5/1973 | Blachut et al. | 350/136 UX |

Primary Examiner—John K. Corbin
Assistant Examiner—Matthew W. Koren
Attorney, Agent, or Firm—Cushman, Darby & Cushman

[57] ABSTRACT

This relates to an image interpretation instrument including a viewing head and a carriage for supporting imagery. A table provides support for a base, such as a map. The head and the carriage are movable from a first position wherein an observer views both the base and the imagery on the carriage and can thus annotate the base with information derived from the imagery, to a second position wherein the observer views only the imagery and can annotate the imagery directly. Attachment devices for the viewing head are described which permit the viewing of a variety of types of imagery.

18 Claims, 19 Drawing Figures

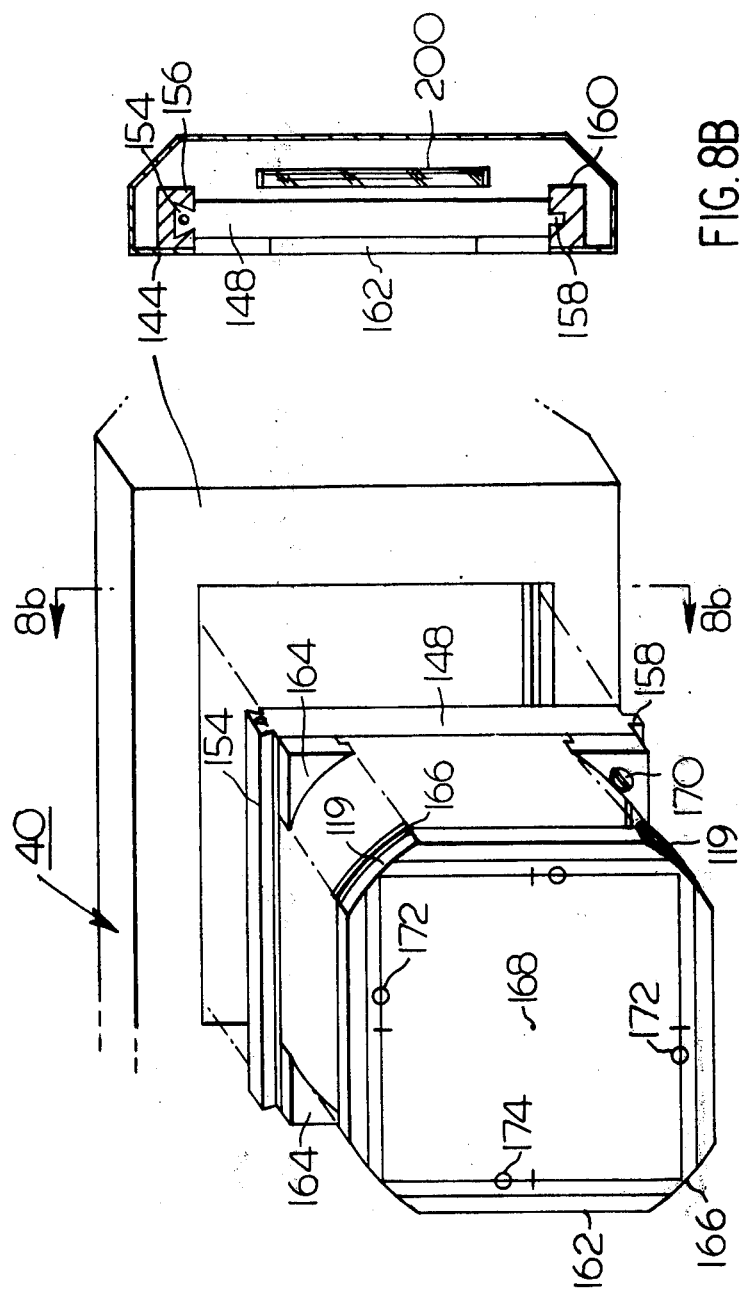

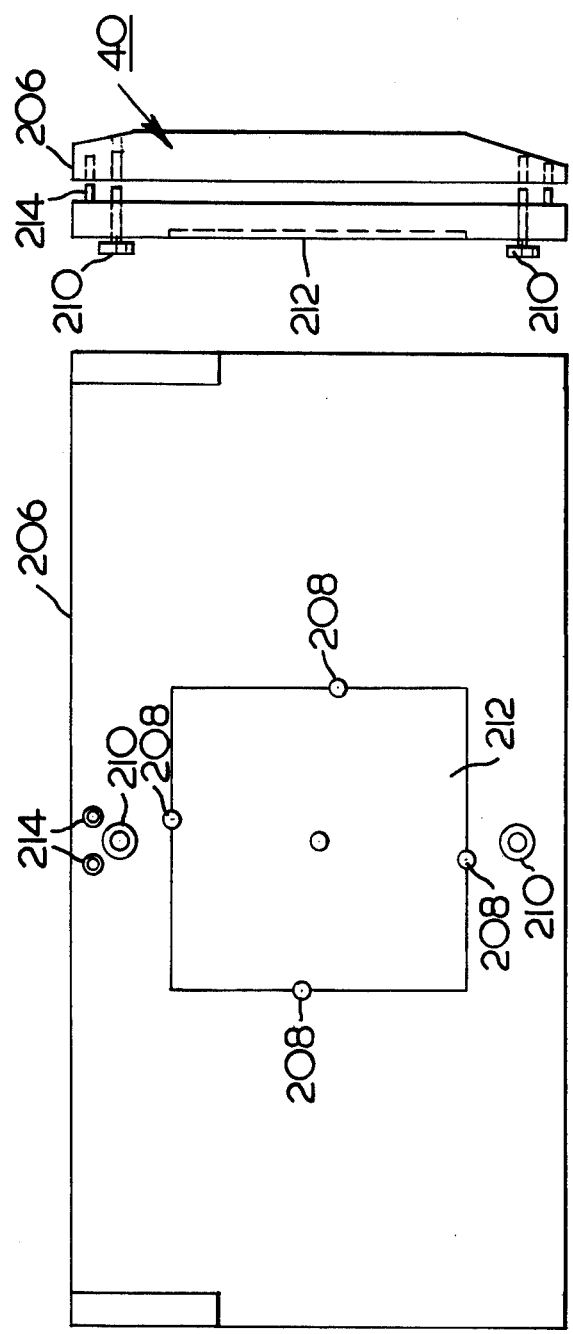

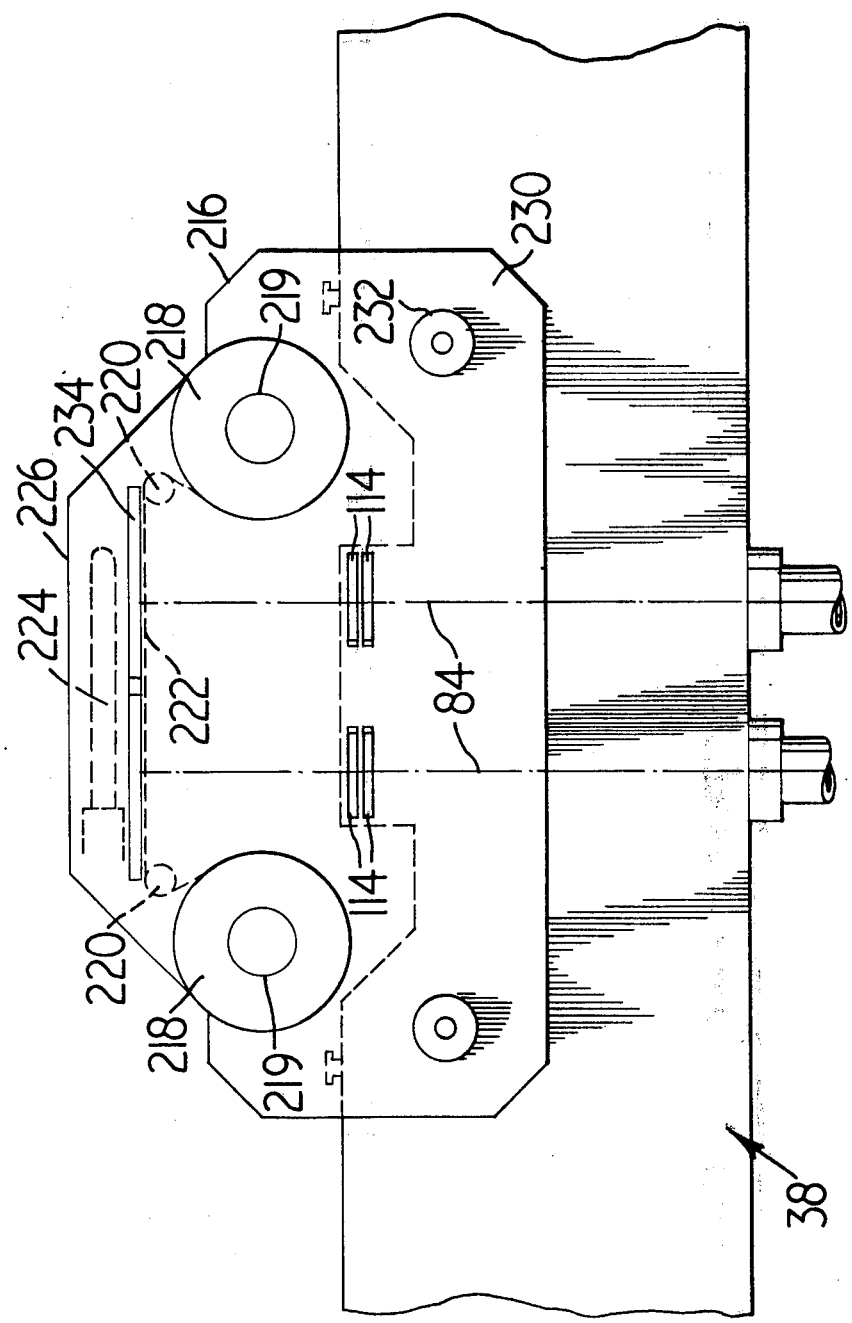

IMAGE INTERPRETATION INSTRUMENT

This invention relates generally to an image interpretation instrument.

Image interpretation involves the derivation of information about the physical terrain (geology, landforms, water resources, soils) and related features (vegetation, land use, cultural development) from images of that terrain. These images may be single photographs, either vertical or oblique, taken from aircraft, earth-orbiting satellites, or any other type of camera platform elevated above the earth's surface; may be single linescan images acquired by sensors utilizing aircraft or earth-orbiting satellites as sensor platforms; or may be sequential, overlapping, vertical aerial photographs obtained by conventional techniques to provide stereoscopic viewing of that terrain as well as photogrammetric mapping capability.

If the images are capable of being viewed in three dimensions (stereoscopically), the interpretationprocedure must involve some form of stereoscope; or if single images are to be studied and interpreted, some form of binocular or monocular viewing instrument.

Most air photo interpretation is based on stereoscopic viewing of a pair of air photos having approximately sixty percent overlap along the line of flight (stereo pair) and therefore the use of some type of stereoscope is mandatory.

In conventional stereoscopic viewing, each eye is focussed on one of the images of the stereoscopic pair by the overlapping segments of the adjacent aerial photographs. In so doing, each eye is provided with a view of the terrain imaged from a different point in space (the adjacent camera positions along the line of flight) and these two images are combined in the brain to provide the three dimensional model. It is thus possible to study, analyse, and interpret the three dimensional image (model) of the terrain, with all its associated components, in as much detail as the image acquisition technique is capable of.

Some stereoscopes are capable of utilizing opaque prints only; some, combined with a light table (to provide transmitted light), may utilize transparencies; and some are designed to handle both types of imagery by the incorporation of a transmitted light source in the instrument.

All of these instruments require annotation of the interpreted information:

a. directly to the opaque print, b. to an acetate overlay to the opaque print, c. to an acetate overlay to the transparency, or d. through a mechanical linkage system and some form of stylus to an associated base map.

A wide variety of instruments exist to facilitate the stereoscopic examination of sequential aerial photography. They vary from simple lens (pocket) stereoscopes, through mirror stereoscopes with variable ocular magnification, more complex mirror stereoscopes with image scanning capability provided by movable image carriages, optical stereoscopes with image scanning incorporated in the optical train, to very complex, stereoplotter-type instruments with mechanical linkage to tracing pens (or pencils) for mapping purposes. Special, binocular microstereoscopes are also available solely for the examination of seventy millimeter aerial photography.

A problem with most of the existing instruments is that they tend to be relatively inflexible insofar as the types of imagery which they can accept are concerned and also as to the manner in which the interpreted information can be compiled or annotated.

A principal object is to provide an image interpretation instrument which provides a degree of flexibility in the manner in which the interpreted information can be compiled.

Another object of the present invention is to provide an image interpretation instrument which, with the addition of suitable attachments thereto, can be used to interpret a wide variety of types of imagery as will be described in greater detail hereinafter.

Additional objects of the invention will be apparent from the following.

Thus, in accordance with the invention there is provided an image interpretation instrument including a viewing head and an image carriage in spaced relation to said viewing head for supporting imagery to be viewed through the viewing head. A table is spaced from the viewing head for supporting a base, such as a map, to be annotated with information derived from the viewing of the imagery supported on the image carriage. Said viewing head has optical means adapted to provide an observer with a combined view of the imagery on the carriage and the base supported on the table when the viewing head and the carriage are ina first position relative to the table thereby to permit the observer to annotate the base with information derived from the view of the imagery on the carriage. The instrument further includes means mounting said viewing head and image carriage for movement relative to said table from (1) said first position wherein said optical means are capable of providing the observer with the combined view of the imagery on the carriage and the base supported on the table, to (2) a second position wherein the optical means is incapable of providing the observer with a view of the base but remains capable of providing the observer with a view of the imagery on the image carriage with the second position of the carriage being such as to permit the observer to annotate the imagery on the carriage with information derived from the viewing thereof. Means are provided for positively locating said viewing head and image carriage at either one of said first and second positions.

Apparatus according to a preferred form of the invention permits viewing of a wide variety of types of imagery in either one of two basic modes as defined by the first and second positions recited above. In the first mode, the observer can annotate the information derived from the imagery to any desired base. This may be termed the "annotation to the base" mode. In the second mode, which may be termed the "annotaton to the imagery" mode, the observer annotates the imagery directly in much the same way as is done when using a conventional mirror stereoscopic system.

Provision is made for stereoscopic or binocular monoscopic viewing of imagery in either one of the two modes noted above.

If the "annotation" mode is selected (in the case of stereoscopic viewing of the imagery), the viewing head and image carriage are moved to the first position so that a stereoscopic, three dimensional model created from the imagery may be superimposed on, and matched to, the base. The interpreted information can then be directly annotated to the base by the observer.

If the "annotation to the imagery" mode is selected, the viewing head and image carriage are moved to the second position so that the observer can annotate directly to the imagery on the image carriage.

The image carriage is arranged to accept, by way of example, conventonal aerial photographs (prints) for stereoscopic viewing by incident light or transparencies or diapositives for viewing by transmitted light. With the addition of a supplementary image holder on the image carrier, imagery in the form of single aerial photographs (prints or transparencies), Earthsat or Skylab images (prints or transparencies), or any other suitable type, may be mounted and viewed binocularly by incident light or transmitted light.

If information is to be transferred from a single image to the base, the single image, mounted on the supplementary image holder, will be viewed binocularly, but not stereoscopically, with the viewing head and image carriage in said first position so that this image will be superimposed on the base. In addition to providing for transfer of interpreted information from a single aerial photograph to a base, this arrangement is particularly useful in studying and compiling from Earth Resources Technology Satellite (Earthsat) imagery of the linescan type, in studying and compiling from other earth-orbital satellite imagery of the photographic type (Gemini, Skylab, etc.) in studying, comparing, and compiling from thermal infrared scan imagery, radar imagery, and even map segments.

In all of the above data transfer techniques, there is the facility for changing scale from image to base by enlargement or reduction. Precise limits of this scale change will be dependent on the optical design.

The viewing head is conveniently arranged to receive a variety of attachments. One such attachment is arranged to permit the stereoscopic viewing of a pair of images mounted on the image carriage. However, in certain cases, one may desire to analyze film such as 35 mm. or 70 mm. format imagery. A suitable attachment for viewing this type of imagery is described hereinafter.

Thus, it will be seen that the instrument of the invention is adaptable to a wide variety of situations and permits information, interpreted or otherwise, to be transferred stereoscopically or monoscopically from photograph to map, from photograph to photograph, from photograph to mosaic, from photograph to orthophotograph, from map segment to any of the above, or from line-scan imagery to any of the above.

The viewing head provides a convenient support for the various controls on the image interpretation instrument. In the preferred form of the invention all controls, except for the adjustment means for the initial mounting and orientation of the images on the image carriage and the adjustment means for the base table to take care of tip and tilt, are arranged so as to be easily accessible on the viewing head In the drawings which illustrate, by way of example, embodiments of the invention:

FIG. 8A is an "exploded" perspective view of the right side of said image carriage and holder assembly which illustrates some of the details of design;

FIG. 8B is a side elevation view of the right half of the image carriage (a wall of which is cut away) to illustrate the image holder plate and its associated traverse rail and guide rail assembly;

FIG. 11 is a front view of the supplementary image holder for single images;

FIG. 11A is a side elevation view of said supplementary image holder and the image carriage illustrating the method of mounting the former on the image carriage;

FIG. 12 is a plan view of a further viewing head attachment for the viewing of 70 mm. images (transparencies) and the like.

Figure 1:
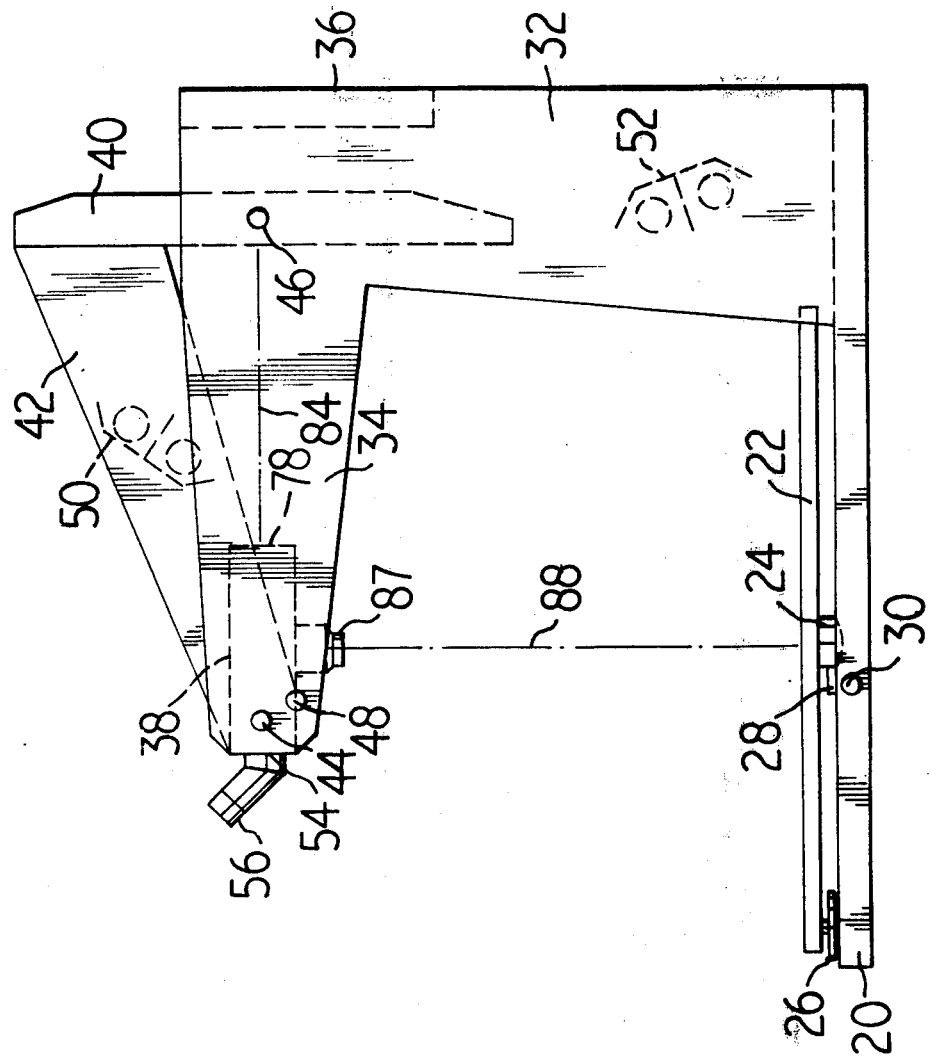
FIG. 1 is a side elevation view of the instrument of the present invention with the image carriage in the "up" or annotation-to-base mode.
Figure 2:
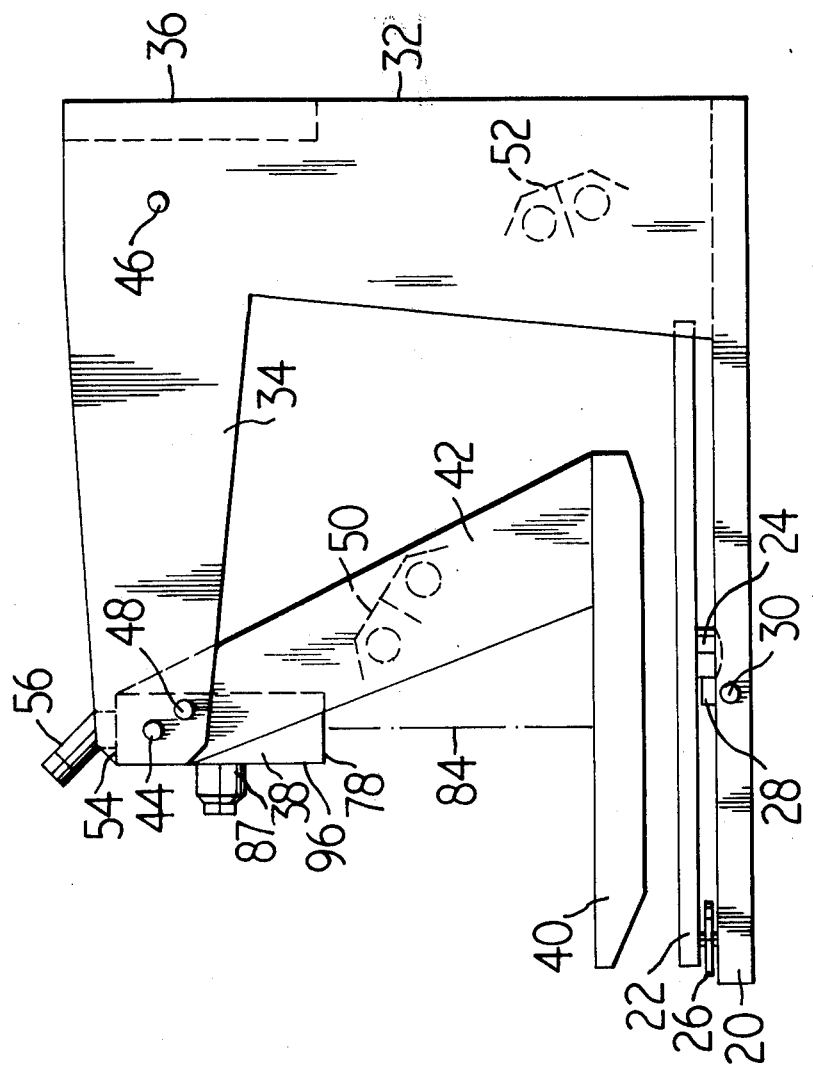
FIG. 2 is a side elevation view of the instrument of the present invention with the image carriage in the "down" or annotation-to-image mode.
Figure 3:
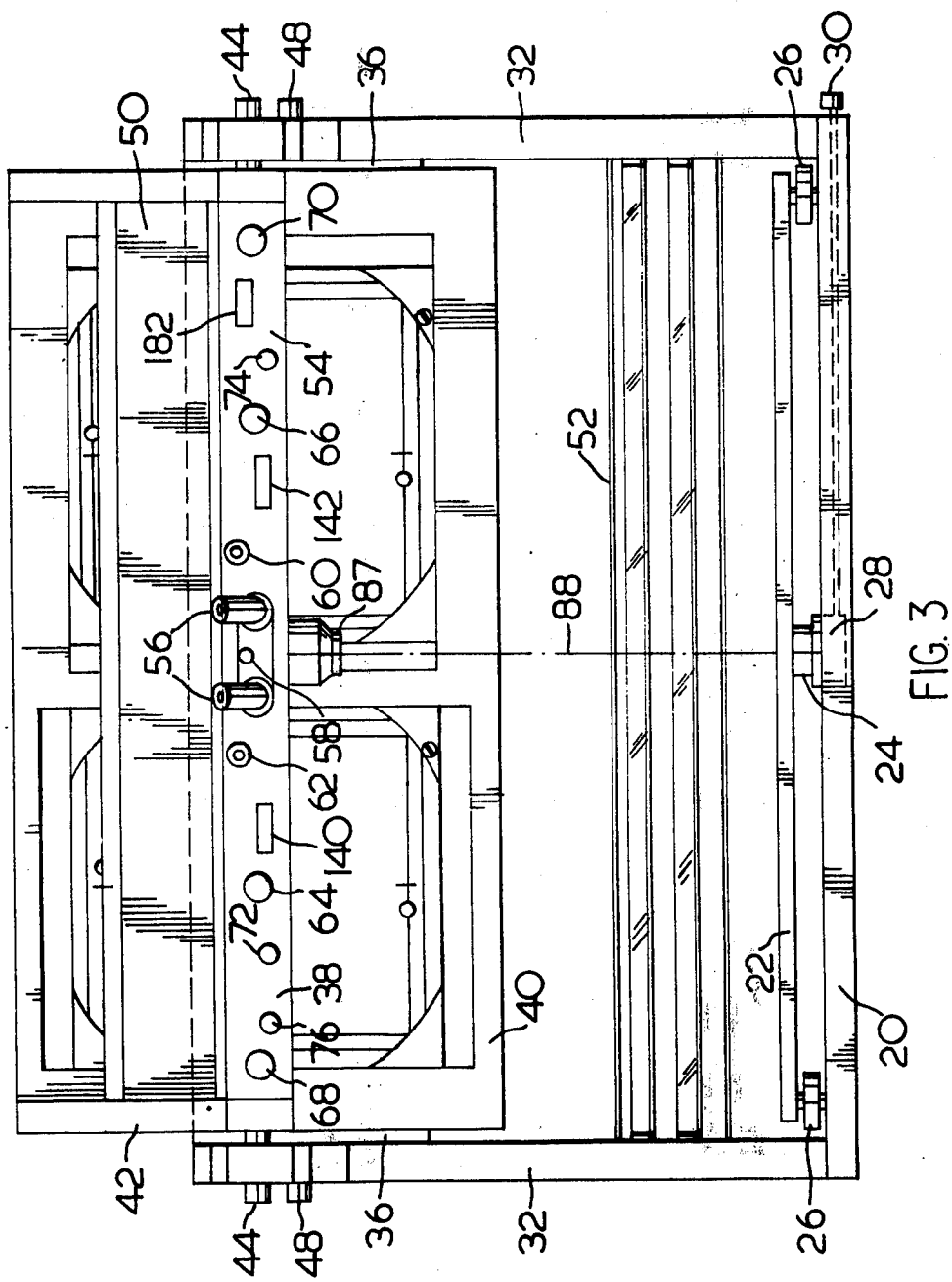
FIG. 3 is a front elevation view of said instrument in the "up" annotation-to-base mode.

With reference to FIGS. 1, 2 and 3 the image interpretation instrument includes a generally flat base plate 20 having a flat table 22 of rectangular outline mounted thereon by means of a centrally located ball and socket assembly 24. A spaced apart pair of levelling screws 26 are disposed adjacent to the front edge of the base plate 20 and the table 22, rotation of which screws 26 changes the orientation of the table 22 to compensate for small amounts of tip and tilt in the image to be projected thereon. A suitable friction lock 28 associated with the ball and socket assembly 24 helps to prevent changes in the orientation of the table 22 during use. The friction lock 28 may be released by actuating a knob 30 and an associated control rod mounted in the base plate 20.

Table 22 serves to support a base of any desired variety such as a map, photograph, orthophotograph, map segment etc. Hold down clips may be located on the table to secure the base thereto.

A pair of spaced apart, rigid vertical frame members 32 are securely bolted to the rear of the base plate 20, the frame members having correspondingly spaced forwardly projecting cantilever arms 34 disposed above and in flanking relation to the table 22. A horizontal member 36 extends between and is rigidly attached to the upper rear portions of frame members 32 thereby to help in stabilizing the structure.

The outer free ends of arms 34 serve to support a viewing assembly which includes a viewing head 38 which is a somewhat elongated box-like structure, to which is attached, in spaced relation thereto, an image carriage 40. The image carriage 40 is attached to the viewing head 38 by means of a spaced apart pair of image carriage support arms 42. The arms 42 are rigidly connected at their inner ends to respective ends of the viewing head 38 and at their outer ends to respective end portions of the image carriage 40. Arms 42 are of hollow construction so that they can carry portions of the X and Y parallax linkages to be hereafter described as well as illumination control wiring etc.

The entire viewing assembly is mounted to the free ends of cantilever arms 34 by means of horizontal pivot axles 44 defining a pivot axis extending lengthwise through the viewing head 38 thereby enabling the entire viewing assembly to be swung through 90° from the "up" position shown in FIG. 1 to the "down" position shown in FIG. 2 wherein the the image carriage 40 is disposed in a horizontal plane above the table 22. In order to lock the viewing assembly in the "up" position the upper end portions of frame members 32 are provided with axially movable locking buttons 46 each having a short pin portion projecting through its associated frame member 32 and adapted to enter a small recess 47 drilled in the end wall of the image carriage 40. When the locking buttons 46 are pulled outwardly, the viewing assembly is free to pivot downwardly. In order to lock the viewing assembly in the "down" position, similar axially movable locking buttons 48 are disposed in the free end portions of the cantilever arms 34, the pin portions of which are adapted to engage in small recesses (not shown) drilled in each of the support arms 42.

In order to provide incident illumination for photos carried on the frontal face of the image carriage 40, a light source 50 of any suitable variety is mounted so as to extend between the support arms 42, which source 50 includes a pair of elongated lamps with an elongated reflector positioned behind them to direct light toward the front face of the image carriage 40. Incident illumination for the table 22 is provided by a similar lamp and reflector assembly 52 (as shown in dashed lines in FIG. 1) extending between the vertical frame members 32 so as to cast light obliquely onto a map or other base positioned on the table 22.

The viewing head 38 is in the form of an elongated box-like structure and serves to contain the optical systems for the device as well as illumination control switches, parallax controls, scan controls, readout panels etc., as will be more fully described hereinafter.

The frontal face 54 of the viewing head carries centrally located oculars 56 each of which may be swivelled around 180° to provide for convenience of viewing in either of the above described two positions of the viewing assembly. This face 54 also carries a series of control knobs including inter-ocular spacing adustment knob 58, an image viewing optics zoom control knob 60, a base viewing optics zoom control knob 62, Y and X axis scan controls 64 and 66 and their associated Y and X co-ordinate readouts 140 and 142, and Y and X parallax control knobs 68 and 70. In addition, illumination control buttons 72 and 74 can be provided to control the illumination of transparencies mounted on the frontal face of the image carriage 40. An illumination control on/off switch button 76 for all the illumination systems is also conveniently provided.

Figure 4:
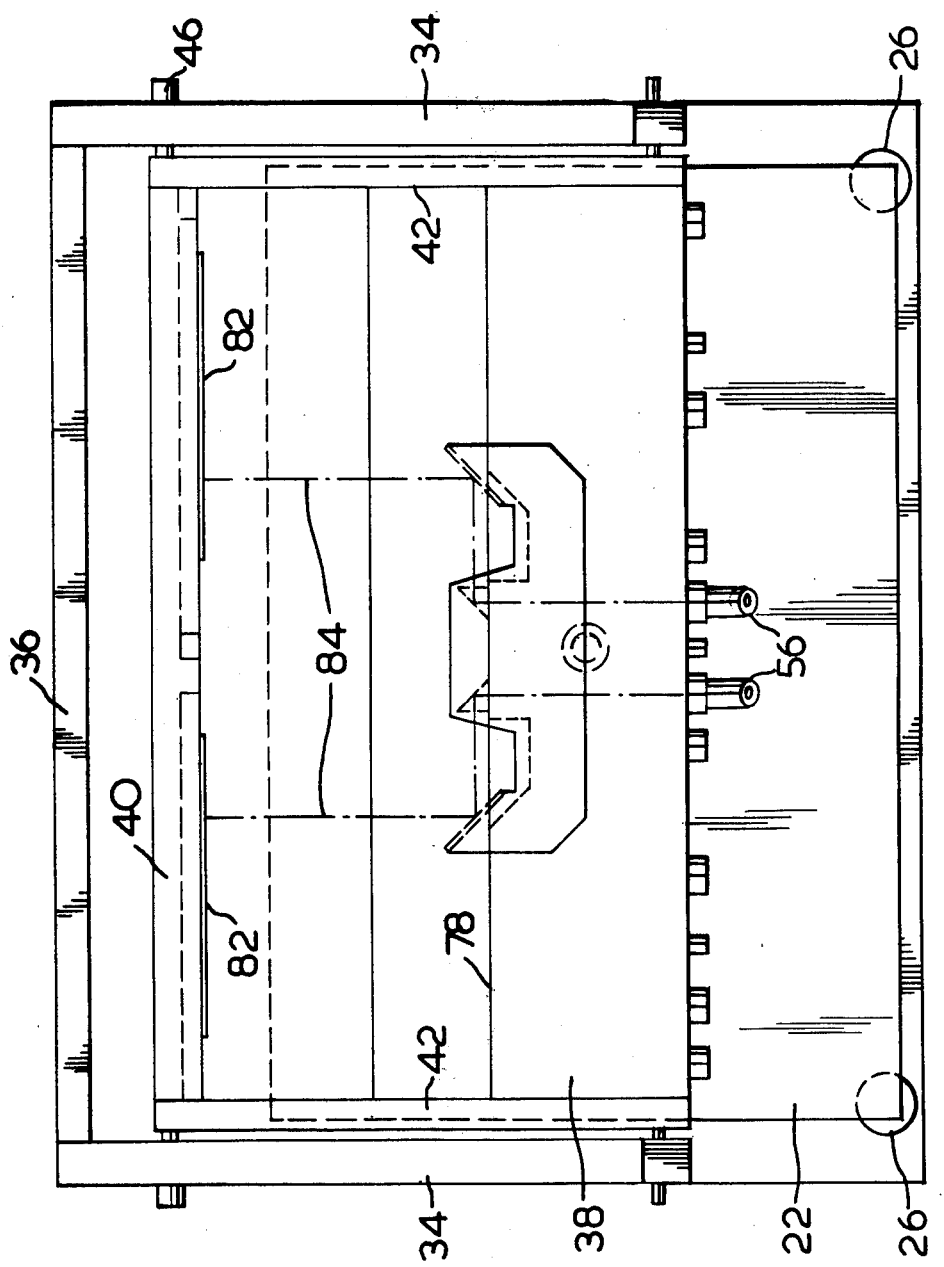
FIG. 4 is a plan view of said instrument in the "up"-'annotation-to-base mode.
Figure 5:
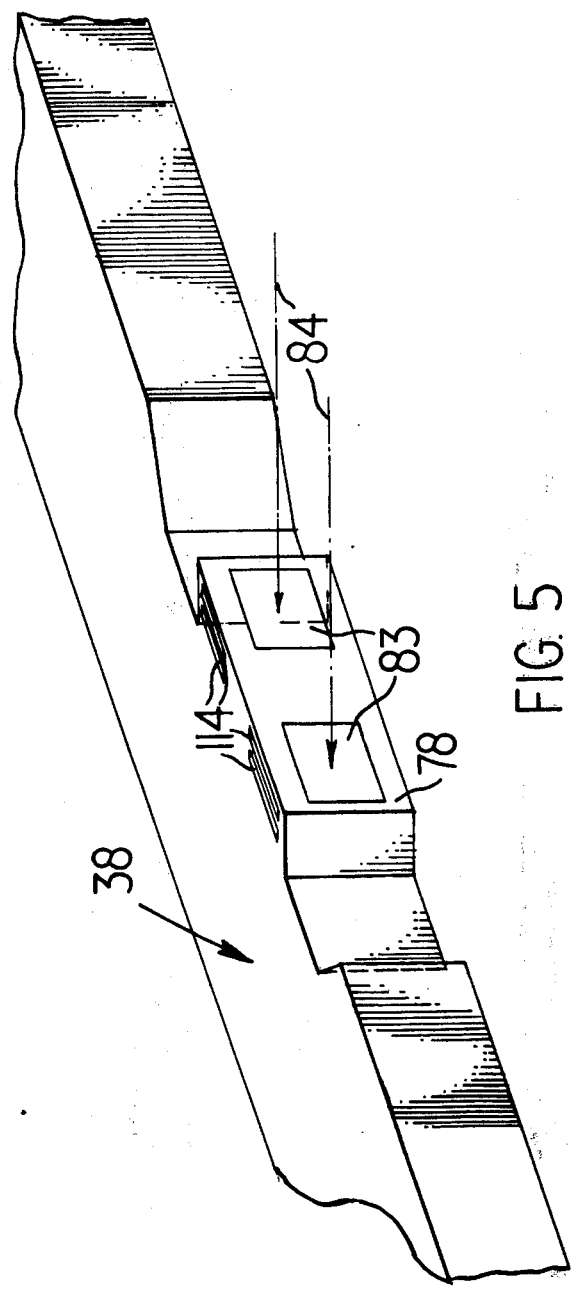
FIG. 5 is a perspective view looking toward the rear of the viewing head.
Figure 10:
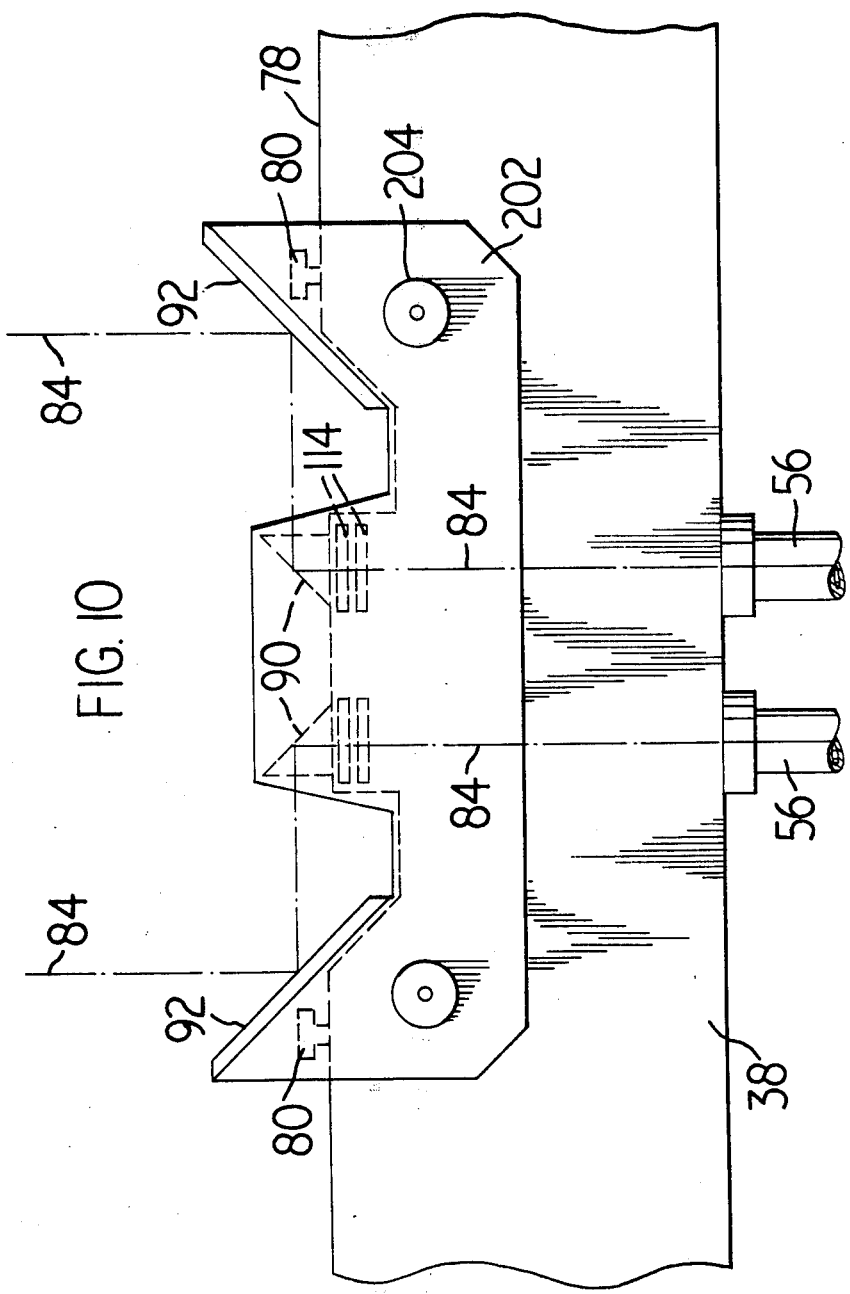
FIG. 10 is a plan view illustrating a viewing head attachment for viewing a pair of images which are mounted on the image carriage.
Figure 10A:
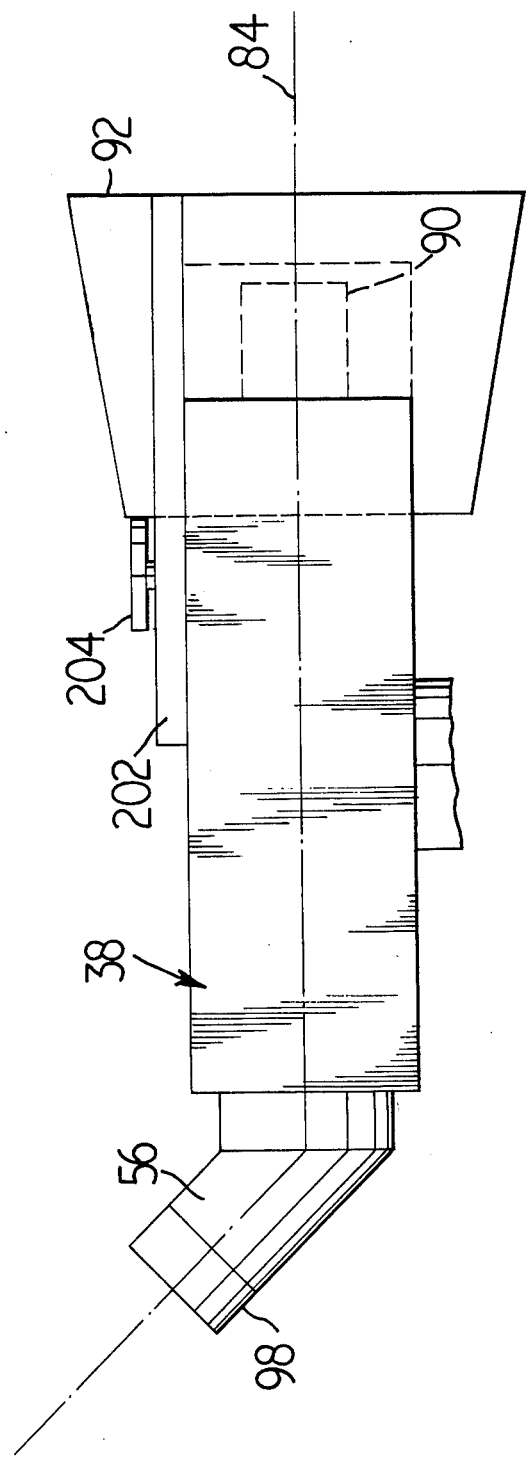
FIG. 10A is a side elevation view of the image viewing attachment of FIG. 10 as seen when mounted on the viewing head.

The rear face 78 of the viewing head 38 is provided with a pair of spaced apart vertically disposed rails 80 which enable a variety of attachments to be connected thereto in accurate alignment with the optical axes 84. Spaced apart windows 83 (FIG.5) in the rear face of the viewing head admit light passing along optical axes 84 into the optical systems within the head 38. FIGS. 4, 10 and 10A sow a portion of the viewing head 38 having an attachment mounted thereon for viewing photos, such as 9 × ]inch air photos (designated 82), mounted on the frontal face of the image carriage 40. This attachment as well as other attachments will be described in further detail thereafter.

Figure 6:
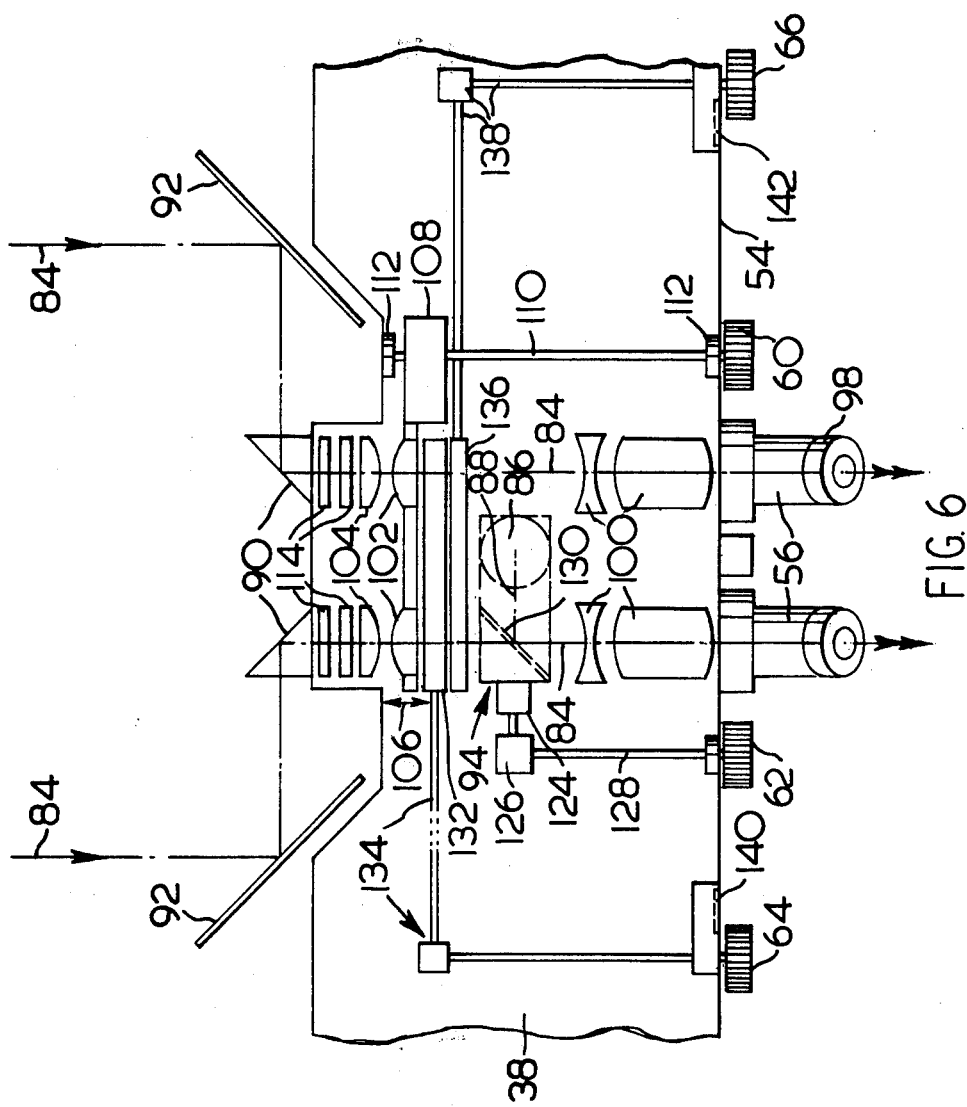
FIG. 6 is a plan view diagrammatically illustrating the optical systems and their controls in the viewing head.
Figure 7:
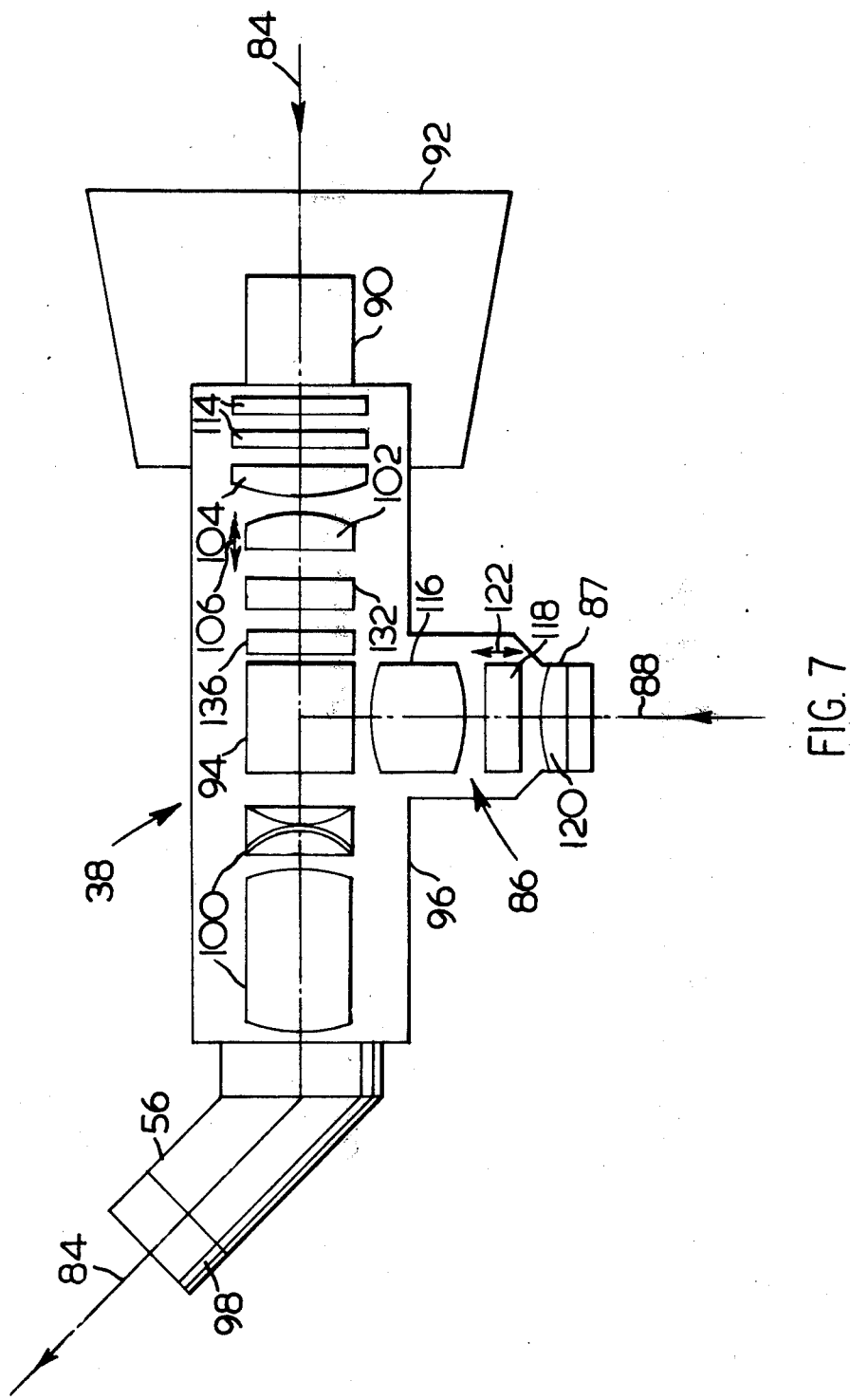
FIG. 7 is a side view diagrammatically illustrating the optical systems in the viewing head.

As shown in FIGS. 4, 6 and 7 the optical systems are mounted in the viewing head 38 and comprise an image viewing optical system defining spaced apart optical axes 84 and a base optical system 86 defining an optical axis 88 which is at right angles to the optical axes 84. Both of these systems are advantageously of the well known "zoom" type to enable the overall magnification of the optical systems to be varied as desired. Basically, the optical viewing axes 84 pass through the oculars 56, the zoom optical system within the viewing head 38, and the prisms and mirrors 90, 92 of the viewing head attachment to the imagery, such as air photos 82, on the front face of image carriage 40. This system provides a stereoscopic image which is superimposed on the single image of the base supported on table 22 which is transmitted to the observer through the base zoom optical system 86 and a beam splitter 94 incorporated in the zoom optical system of the viewing head. The base viewing optical system 86 includes a lens holder 87 projecting through the bottom wall 96 of the viewing head thereby to feed the image of a base on table 22 into the base optical system 86. The optical system 86 is only used when the instrument is in the "up" image viewing annotation-to-base mode, a lens cap being used to cover up the lens holder 87 when system 86 is not in use.

The zoom optical systems for viewing the images on the image carriage is best seen in FIGS. 6 and 7. Since zoom optical systems are basically conventional the individual components will not be described in detail. Zoom optical systems are very well known generally and those skilled in the art will readily be able to select a system which provides the desired ranges of magnification. The oculars 56, which were previously described as being rotatable relative to the viewing head, conveniently incorporate interchangeable eye pieces 98 to vary the overall magnification range of the system. The zoom lens system incorporates lens groups 100, 102 and 104 spaced along the optical axes 84, with lens group 102 being adjustable along the optical axes 84 in the direction of arrows 106 to provide the variable or "zoom" magnification. This motion in the direction of arrows 106 is controlled by a micrometer gear assembly 108 of any suitable design which is actuated manually via drive shaft 110 mounted in bearings 112 and connected to the above mentioned image zoom control knob 60 located on the front of the viewing head.

A plurality of slotted lens holders 114 are located in the paths of optical axes 84 at the rear of the viewing head 38 thereby to permit the insertion of filters, supplementary lenses, or in some instances, optical wedges, thereby to modify the optical properties of the system as desired.

The zoom base viewing optical system 86 incorporates a number of lens groupings 116, 118, 120 disposed in a single optical axis 88. The lens 118 is movable in the direction of arrows 122 (see FIG.7) along the optical axis 88 to provide the variable or "zoom" magnification. This zoom movement 122 is controlled by a micrometer gear assembly 124 similar to the one controlling the zoom movement of the image viewing optical system. This is controlled through a worm gear drive 126 and drive shaft 128 by the zoom base optics control knob 62 located on the front face 54 of the viewing head 38.

In order to superimpose the stereoscopic image derived from the air photos (or other imagery) on the image derived from the base (map, mosaic orthophoto etc.) the beam splitter system 94 is incorporated into the system. Beam splitters are well know per se and need not be described in detail. Basically this system incorporates a prism or mirror (not shown) in optical path 88 which turns the optical path 88 through a 90 degree angle into intersecting relation with the left hand optical path 84 (FIG.6). At the point of intersection of these two paths a beam splitter mirror 130 is is located. Beam splitter mirrors are very well know per se. They are half-silvered and thus semi-transparent and are capable of reflecting light as well as letting light pass therethrough. Thus, the image passing along the left hand optical path passes through the beam splitter mirror 130 and then continues in the same path; however, the image derived from the base viewing optical system 86 is reflected by the beam splitter mirror 130 along the left hand optical path. (That portion of the optical path 84 carrying the combined images has a double headed arrow thereon as shown in FIG. 6).

The left eye thus sees an emage of the left hand stereoscopic overlap (or a portion thereof depending on the degree of zoom magnification) with an image of the base super-imposed. The right eye sees an image of the right hand stereoscopic overlap (or portion thereof). These images are combined in the brain and the operator sees the stereoscopicmodel resulting from the two stereo overlap views on the image carrier with the image of the base superimposed. Suitable adjustments of zoom magnification (for both images) and tip andtilt by means of the table levelling screws 26 (see FIG. 1), will be necessary to ensure detail matching.

The image viewing optical system is provided with suitable means for permitting vertical and lateral (Y and X axis) scanning of the images mounted on the image carriage 40. Optical scanning systems for use in optical systems of the type shown are common knowledge in the art and accordingly the X and Y scan systems are shown diagrammatically in FIG. 6. The X axis scanning systems incorporates an arrangement of lenses and prisms whose components are synchronised such that an adjustment in their relative position effects angular movement of the optical axes 84 in the horizontal direction to scan the image while the Y axis scan system effects a similar angular movement of the optical axes in the vertical direction. With reference to FIG. 6 the Y axis scan system includes optical components 132 positioned in the optical axes 84, such components being moved to effect Y scanning by a control linkage 134 connected to the Y axis control knob 64 disposed on the front face 54 of the viewing head 38. The X axis scan system includes a similar set of optical components 136 located in the optical axes 84 and connected via linkages 138 to the control knob 66 on the front face of the viewing head. The Y axis scan control button 64 is connected to a readout assembly 140 while the X axis scan control button is connected to a further readout 142. These readouts provide the viewer with a visual indication of the X and Y co-ordinates of any point being viewed on the image. The X and Y scan controls may also be provided with means enabling them to be interfaced with a computer for recordal as necessary.

If a monoscopic image such as an Earthsat (ERTS) image is substituted for the stereoscopic pair of aerial photographs 82 on the viewing head the operator will see this image (binocular viewing) superimposed on the base image. An image carrier for single images is described hereafter with reference to FIGS. 11 and 11A.

The various attachments for the rear of the viewing head 38 will be described in further detail hereinafter. The image carrier 40 and its associated structures will now be described reference being had to FIGS. 8, 8A, 8B, 9, 9A, 9B and 9C.

Figure 8:
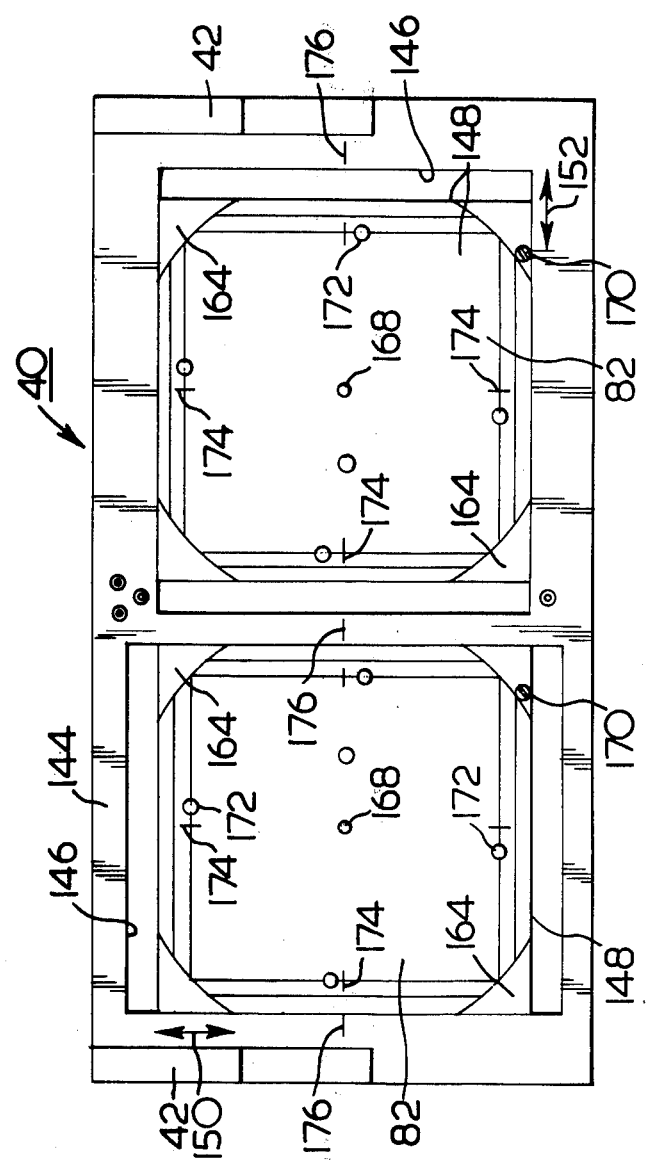
FIG. 8 is a front elevation view of the image carriage assembly illustrating the left and right image holders, their respective movement capabilities in the Y and X axes, the rotatable image holder plates and associated assemblies.

The image carriage 40 comprises a hollow box-like structure having a frontal face 144 of generally elongated rectangular outline, which face is normal to the optical axes 84 defined by the above described optical system. Frontal face 144 includes a pair of laterally spaced rectangular apertures 146 therein. Mounted in each of these apertures are transparent rectangular plates 148, each made from a clear plastics material. As seen in FIG. 8 the left hand plate 148 is movable vertically in the Y direction as shown by arrow 150 by a sort distance e.g. ± 2.54 cm. while the right hand plate is movable by the same distance in the X direction as shown by arrow 152.

The mechanism which controls the movement in the X and Y directions of plates 148, consists of an assembly of rods, gears and screws which are housed in the image carriage 40, image carriage support arms 42, and viewing head 38. The movement of the left plate 148 along the Y axis 150 allows for adjustment of Y-Parallax to match the right hand image. The movement of the right plate along the X axis 152 provides X Parallax measurements with reference to a pair of fixed dots (not shown) in the optical system. The system for effecting such movement is described more fully hereinafter with reference to FIGS. 9, 9A, 9B and 9C.

With reference to FIGS. 8A and 8B (FIG.8A being an "exploded" view) it will be seen that the right hand image plate 148 which moves in the X direction, is guided in such direction by a traverse rail 154 extending along its upper edge and fitting within a matching recessed channel 156 attached to the back of the image carrier face 144. A guide rail 158 at the lower edge of image late 148 fits into a mating groove means 160 attached on the back of the image carrier face 144. The left hand image plate 148 is guided in essentially the same fashion except that the traverse rails and guide rails are vertically disposed the traverse rail preferably being on the left side and the guide rail on the right side of the late 148 as seen in FIG.8 to permit the above described movement in the Y direction.

Each of the image plates 148 carries on its face a respective holder plate 162 each being rotatable relative to its associated image plate 148. Holder plates 162 are also of transparent material. The image plates 148 are each provided with four outwardly projecting bearing posts 164 having arcuately contoured faces thereon, each contoured face having a channel therein. Each image holder 162 has arcuately contoured portions 166 which fit into the channels in the bearing posts 164, to retain the image holders 162 on the faces of plates 148, such contoured portions lying in an imaginary circle centered at the center point 168 of the image holder. Angular rotation of the image holers 162 is limited within the range of the bearing surfaces 119 by suitable stops (not shown). Each holder 162 can thus be manually rotated about its center point 168 by a small amount in order to properly orient a print mounted thereon. A clamp or lock screw 170 of any suitable variety is provided on each plate 148 which is tightened to bear against the holder plate 148 which is tightened to bear against the holder plate 162 to prevent unwanted rotation of same. Small clips, diagrammatically illustrated by references 172, hold the prints on the flat frontal faces of the respective image holders 162.

In operation, a print 82 is attached to each holder 162 by simple clips diagrammatically shown by references 172 and is oriented so that the fiducial marks on each image 82 coincide with the corresponding fiducial marks 174 engraved on the holder plate. The holder plates with attached photos are rotated until the lines joining the principal points and the conjugate principal points of the photos are aligned with the flight line 176 engraved on the face of the image carriage. The above general procedure for effecting alignment will be apparent to those skilled in the art. The mounting and orientation of imagery on carriage 40 is easily carried out with the image carriage 40 in the "down" position shown in FIG. 2 since in this position the operator or observer has convenient access to the image holder plates etc. on the face of carriage 40.

If the annotation is to be a "base" of some type mounted on the table 22, the image carriage 40 is swung up into the "up" position viewing mode shown in FIG. 1, so that the imagery is supported in a vertical plane, and locked using the image carriage locking buttons 46. If, however, the annotation is to be made directly to the imagery mounted on carriage 40, the image carriage is locked in the "down" mode shown in FIG. 2 in order that the observer may have convenient access to the imagery. In this mode of operation, a lens cap is positioned over lens holder 87 and the oculars 56 are rotated 180°0 to the position shown in FIG. 2.

FIGS. 9, 9A, 9B and 9C illustrate the X-Parallax image motion controls and linkages.

Figure 9:
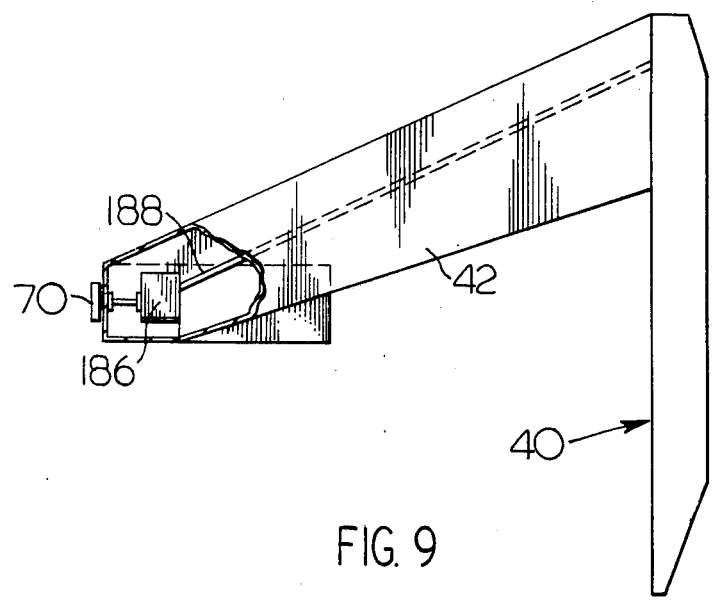
FIG. 9 is a side elevation view of the viewing assembly cut-away to illustrate a portion of the X-Parallax drive mechanism.
Figure 9A:
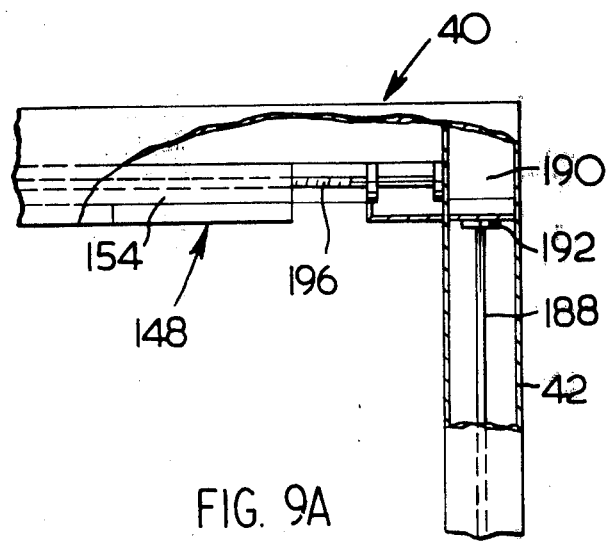
FIG. 9A is a plan view of part of the image carriage and support arm illustrating the X-Parallax image plate drive mechanism in the image carriage.
Figure 9B:
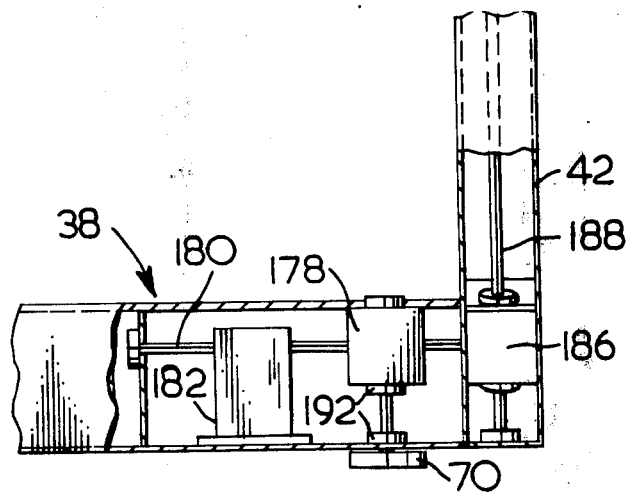
FIG. 9B and 9C are plan and front elevation views respectively, parts of which are cut-away to illustrate the X-Parallax vernier drive mechanism and readout in the viewing head.
Figure 9C:
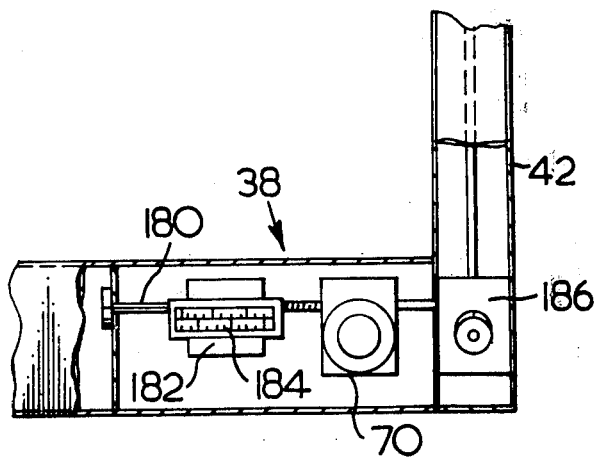

With reference to FIG. 9B and 9C portions of the viewing head 38 are shown cut away to show the internal mechanism. The X-Parallax control knob 70 drives a worm gear assembly 178, which, in turn, rotates a drive shaft connnected to a micrometer screw 180, which, in turn, activates an X-Paralax vernier readout mechanism 182. The amount of X-Parallax movement may be read through the readout window 184 on the front face 54 of the viewing head 38. The same worm gear assembly 178 drives a second gear assembly 186 and thus another drive shaft 188 which is housed in the image carriage support arm 42 (FIG. 9). This shaft 188 rotates a third worm gear assembly 190 in the image carriage 40. All drive shafts are fitted in suitable bearings 192. With reference to FIG. 9A a portion of the image carriage 40 and attached support arm 42 are shown, the external walls thereof being cut away to show the internal structure. The above mentioned drive shaft 188 rotates the worm gear assembly 190 which, in turn, rotates a micrometer screw 196. The micrometer screw 196 extends into an internally threaded recess in the traverse rail 154 attached to the upper edge of plate 148. Rotation of the screw 196 causes the image plate 148 attached to the traverse rail to move along the X axis in either direction as shown by arrow 152 depending on the direction of rotation of the X-Parallax control knob 70.

The gear ratios are designed such that rotation of the X-Parallax control knob 70 causes the X-Parallax readout mechanism 182, and the image holder plate 148, to move precisely the same amount in the same direction. This micrometer action should provide an accuracy of 0.01 mm. The system permits the measurement of X-Parallax via the readout window 184.

The Y-Parallax movement is controlled by an identical system from control knob 68 on the viewing head 38.

It is also envisioned that the X-Parallax readout may be of a digital type and may be coupled with a computer if desired.

The image carrier 40 also contains therein illumination lamps 200 (FIG. 8B) which are located behind the respective transparent plates 148 and their associated rotatable image holder plates 162. These lamps 200 provide transmitted illumination for viewing transparent images mounted on the image carriage 40. When opaque prints are mounted on image carrier 40, incident illumination is provided by the previously described incident light source 50 mounted between the carrier arms 42. The control means for the light sources are, as mentioned above, conveniently located on the viewing head 38. These should be so arranged to allow the illumination (whether incident or transmitted) of one image to be varied relative to the other image. The illumination for the base on table 22 can also be varied. This permits matching of illumination from one image to the other on the image carriage or from images on the image carriage to the base carried by table 22. The illumination system operates in both modes of the instrument i.e., in the annotation-to-the-imagery mode and also in the annotation-to-the-base mode.

The instrument described herein is capable of use with a variety of attachments for the viewing of various types of images. The viewing head attachment for 9 × 9 inch imgery mounted on the viewing head 38 has already been referred to in connection with the description of the optical system. This attachment is shown more clearly in FIGS. 10 and 10A. The attachment includes a metal support frame 202 which rests, in use, on the top surface of the viewing head 38. Frame 202 has a pair of spaced apertures therein to receive mounting screws 204 which are threaded into correspondingly spaced apertures in the viewing head 38. Frame 202 has attached thereto the previously mentioned spaced apart pair of mirrors 92 which obliquely face toward one another such that each mirror has its reflecting surface at a 45° angle to its associated optical axis 84. Mounted on frame 202 between the mirrors 92, are a pair of 45° prisms 90 which are spaced apart a distance so as to coincide with the spacing of the optical axes 84 defined by the two optical trains within the viewing head 38. Light from the two images on the image carriage 40 is thus reflected by the two mirrors 92 and turned by 90° angles inwardly toward their associated prisms 90 which, in turn, rotate the light beams by 90° angles so that the light can pass along and through the spaced optical axes 84 defined by the lens groupings in the viewing head 38. As noted previously, a spaced pair of vertical rails 80 are provided on the rear face 78 of the viewing head, which rails cooperate with mating channels formed in the frame 202 to position the mirrors 92 and prisms 90 accurately relative to the optical systems within the viewing head 38.

The side view (FIG. 10A) further illustrates the relationship of the viewing head attachment and its components to the viewing head 38. The rail alignment means 80 (FIG. 10) is not shown on this diagram.

Non-stereoscopic viewing of a single image, such as an Earthsat (ERTS) Earth Resources Technology Satellite image, is possible utilizing the supplemental image carriage as is described more fully hereinafter with reference to FIGS. 11 and 11A and a suitable combination of optical wedges and lenses introduced into the zoom image viewing optical system of the viewing head utilizing the slots 114 disposed in the rear of the viewing head. This necessitates removal of the viewing head attachment shown in FIGS. 10, 10A. The optical wedges, lenses etc. which are inserted into these slots 114 will be arranged to cause the optical axes 84 to converge toward one another and to centre on the single image supported on the supplemental image carrier.

This supplementary image carrier is in essence a generally rectangular box 206 with image mounting clamps 208 on the face of same, which box is attached to the image carriage 40 by means of mounting screws 210. The box 206 has a centrally located transparent frontal face 212 so that light from a source (not shown) within the box can pass through a transparent image mounted on the frontal face of the box. It has a plug in electrical connection 214 which connects an illumination source (not shown) within the box to the electrical circuitry within the image carriage 40.

This unit is designed to facilitate the detailed binocular, monoscopic examination of single images at various magnifications. These images may include various forms of air photos (colour transparencies, diapositive, or prints), Earthsat (ERTS), Skylab images, or map segments.

In the above single image conformation, the instrument may be used not only to study and analyse such non-stereoscopic images, but also as a data transfer instrument to compile existing annotation, or features depicted, to any selected base map, mosaic, orthophoto base, or other aerial photograph; to transfer from a segment of a map to any of the above bases; or to transfer from a terrestrial photo to a base sheet.

When the supplemental image carriage is attached to the image carriage 40, the above plug in connection 214 connects the illumination system to the unified illumination control on the face of the viewing head and thus the image brightness may be controlled for viewing or for matching to the base illumination.

Incident illumination for opaque prints or map segments mouted on the face of the supplemental image carrier is provided by the previously described incident illumination means 50 incorporated in the image carriage support arm assembly 42.

FIG. 12 is a plan view of the viewing head attachment for 70 mm. images (transparencies) mounted on the viewing head 38. This attachment comprises an enclosed box-like body 216 defining a chamber in which a spaced apart pair of film spools 218 are rotatably mounted. Spaced rolls 220 guide the film in a path 222 across the optical paths 84. A light 224 in box 226 at the rear of the body 216 provides transmitted illumination. A forwardly extending support plate 230 adapted to rest on the top of the viewing head 38 has spaced apertures therein to receive mounting screws 232.

This attachment permits the stereoscopic viewing of 70 mm. images in the form of rolls of 70 mm. film; as separate, mounted pairs of 70 mm. frames; or as single 70 mm. images (frames).

Spools 218, as noted previously, hold the 70 mm. film to be viewed. When the knobs 219 are rotated, the film travels from one spool to the other via rollers 220, in front of the illumination source in the light housing 226, and is viewed through the windows in the rear face of the viewing head 38, along the optical axes 84. The attachment is mounted on the viewing head 38 using the previously mentioned rail alignment assembly 80, the above noted support plate 216, and the mounting screws 232.

Mounted 70 mm. frames are viewed by inserting them in a conventional slide carrier 234 mounted toward the rear of the attachment and forwardly of the light box 226.

For binocular monoscopic study of single 70 mm. images (frames), a modified slide carrier (not shown) which centres the image and masks the adjacent illumination, may be used. In this case optical wedges are inserted in the slots 114 in the viewing head 38 to orient the previously parallel viewing axes 84 such that they converge on the single image.

I claim:

1. An image interpretation instrument comprising:
   a. a viewing head;
   b. an image carriage in spaced relation to said viewing head for supporting imagery to be viewed through the viewing head,
   c. a table spaced from the viewing head for supporting a base to be annotated with information derived from the viewing of the imagery supported on the image carriage.
   d. said viewing head having optical means adapted to provide an observer with a combined view of the imagery on the carrige and a base supported on the table when the viewing head and the carriage are in a first position relative to the table whereby to permit the observer to annotate the base with information derived from the view of the imagery on the carriage.
   e. means mounting said viewing head and image carriage for movement relative to said table from (1) said first position wherein said optical means are capable of providing the observer with the combined view of the imagery on the carriage and the base supported on the table, to (2) a second position wherein the optical means is incapable of providing the observer with a view of the base on the table but remains capable of providing the observer with a view of the imagery on the image carriage, with the second position of the carriage being such as to permit the observer to annotate the imagery on the carriage with information derived from the viewing thereof,
   f. and means for positively locating said viewing head and image carriage at either one of said first and second positions.

2. The instrument according to claim 1 wherein the means mounting the viewing head and the image carriage comprises a support frame and pivot means connecting the viewing head and image carriage to the support frame and permitting pivotal motion of the head and the carriage from the first position to the second position, the table being disposed on said frame below said viewing head for supporting the base in a generally horizontal position, and said means for positively locating the viewing head and image carriage being arranged such that in said second position said image carriage is disposed over said table in a generally horizontal position to facilitate the annotation of the imagery on the image carriage by the observer.

3. The instrument according to claim 2 wherein said image carriage is rigidly connected to the viewing head in spaced apart relation by support arm means for movement therewith from the first position to the second position as a unit.

4. The instrument according to claim 3 wherein said pivot means defines a pivot axis passing through the viewing head, said image carriage and the means for positively locating the viewing head and image carriage being so arranged that, in said first position, the image carriage supports the imagery in a generally vertical plane.

5. The instrument according to claim 1 wherein said optical means includes, a first optical system to provide a view of the imagery on the image carriage, a second optical system to provide a view of the base on the table when said carriage and said head are in said first position and means for superimposing the view provided by the first optical system on the view provided by the second optical system to provide the observer with the combined view of the imagery on the carriage and the base on the table.

6. The instrument according to claim 5 wherein the first optical system includes spaced apart optical trains defining spaced apart axes to permit stereoscopic viewing of the imagery on said image carriage.

7. The instrument according to claim 6 wherein said image carriage includes a spaced apart pair of image holders thereon for securing the imagery to the carriage in alignment with the spaced apart optical axes and means mounting said image holders to permit movement thereof in mutually transverse directions thereby to provide for parallax adjustments.

8. The instrument according to claim 7 including control means accessible on the viewing head and operably connected to the image holders to provide said parallax adjustments.

9. The instrument according to claim 7 including a light source for providing incident illumination for imagery mounted on the image carriage.

10. The instrument according to claim 9 including a further light source arranged to provide incident illumination for a base mounted on said table.

11. The instrument according to claim 7 wherein said image holders are transparent and wherein light source means are positioned in said carriage in such a manner as to transmit illumination through said transparent image holdes.

12. The instrument according to claim 5 wherein both said first optical system and said second optical system comprise zoom optical systems to enable the overall magnifications of the first and second optical systems to be varied within selected ranges.

13. The instrument according to claim 12 including image zoom control means mounted on the viewing head for adjusting the magnifications of said zoom optical systems.

14. The instrument according to claim 12 wherein said first optical system is provided with means for providing vertical and lateral scanning of the imagery mounted on the image carriage.

15. The instrument according to claim 14 including scan control means mounted to said viewing head and operatively connected to the means for scanning the imagery mounted on the image carriage.

16. The instrument according to claim 1 further including a supplementary image carriage mounted to said carriage, said supplementary image carrier adapted to support a single image thereon, in a position for viewing thereof through the viewing head.

17. The instrument according to claim 1 including attachment means mounted directly to said viewing head for the viewing of transparencies, said attachment means including spool holding means therein to permit the viewing of film in strip form, and a light source associated with said attachment means to provide illumination for the viewing of said transparencies.

18. The instrument according to claim 1 including means to enable said table to be tilted relative to said viewing head to assist in correlating the view of the imagery on the carriage with the view of a base supported by the table.

* * * * *